Patented Oct. 26, 1926.

1,604,125

UNITED STATES PATENT OFFICE.

HERBERT A. KERN, OF CHICAGO, ILLINOIS.

PROCESS OF CLARIFYING WATER.

No Drawing.    Application filed May 26, 1924.  Serial No. 715,784.

This invention relates to methods and materials for use in the treatment of water supplies and more particularly in the clarification of water and the precipitation of the suspended impurities therefrom.

Among the objects of this invention are the provision of a novel material for use in the clarification of water and also the provision of a process for using such material whereby the rate of reaction and the rate of settling of the impurities, as well as the ultimate efficiency of the clarification process, are greatly improved.

Materials which may be used for such purposes are lime, ferrous sulphate and aluminum sulphate. With these materials precipitates are formed which upon settling serve to clarify the water. I have found that certain combinations of these materials and also that sodium aluminate when properly used in connection with certain of these materials, offer several distinct advantages which have heretofore not been available.

The objects of my invention more specifically stated, include the provision of an effective water clarifying compound, such as may be produced from hydrated lime and a solution of a soluble metallic salt.

Further objects will be apparent from the following disclosure and claims relating to my invention.

When a material embodying sodium aluminate is to be used it is preferable that a solution of sodium aluminate be first prepared in such form that it will substantially all remain in solution under normal conditions of use. The process for making such a solution and the materials used are disclosed in my copending application, Serial No. 708,780, filed April 24, 1924. As stated in my copending application solutions containing substantially 18% of sodium aluminate are commercially available. At ordinary temperatures, however, a portion of the sodium aluminate of such solutions will crystallize out. In order to prevent such separation of the sodium aluminate from the solution, a quantity of a material such as caustic soda, is added to the solution and has the effect of retaining the solution substantially entirely in liquid form under its normal conditions of use. Such a solution may embody substantially equal quantities of sodium aluminate and caustic soda or about 16% of each, as disclosed in my copending application.

After preparing such a solution of sodium aluminate and caustic soda, a quantity of one of the above stated water clarifiers may be added to the solution, for example hydrated lime, in the proportion of substantially two pounds of lime to one pound of the solution. The resulting liquid is used directly in the water treatment.

From one to two pounds of hydrated lime added to one-half to one pound of the sodium aluminate solution will produce sufficient of the compound for treating approximately one thousand gallons of water. However, in using this material, it is of course desirable and often necessary to determine by experiment the exact quantity of coagulant to be used in treating a given amount of water and it is also advantageous at times to determine the best mixture of the chemicals to be used.

I have found that the above described mixture produces an exceedingly flocculent but heavy precipitate which settles rapidly. In fact, settling and complete clarification may be effected in substantially one-half the time required with previously used processes and also in much less time than is possible by the independent use of either lime or sodium aluminate.

From a commercial standpoint, the rate of settling is of course of great importance and with my process I am able to substantially double the rate of settling. With a tank of a given size I am able to treat substantially twice as much water as could be treated according to the previously used processes.

I have also found that when hydrated lime is simultaneously added with substantially equal quantities of either aluminum sulphate or ferrous sulphate to the water, a very flocculent and heavy precipitate is formed which settles rapidly. With these materials as well as with the lime-sodium aluminate mixture, I find that the efficiency of the clarification process is increased by adding the hydrated lime simultaneously with or in a mixture or solution with the other coagulants. If the materials are added to the water at one time the rate of settling is greater than when the lime is added independently, before or after the other coagulants are added. From two to three pounds of the hydrated lime and aluminum sulphate mixture or the hydrated lime and ferrous sulphate mixture are sufficient in most cases for the treatment of one thousand gallons of water. In order to secure a rapid and uniform distribution of the mixtures throughout the water, they should preferably be introduced as solutions with water.

The coagulants in all cases should be thoroughly mixed with the water to be treated and to this end, the water may be agitated in a large tank during or after the addition of one of the above mixtures. After thorough agitation the resulting precipitate is allowed to settle.

The clarification of water by means of coagulants has become of widespread importance both in industry and as a public welfare measure since clarification of waters is not only advisable for manufacturing purposes, but also as a step in the purification of municipal water supplies. The materials and processes involving my invention can be used very advantageously for clarifying water in city filtration plants and in all industrial plants where clarification of water is desirable, especially in cases where the rate of settling has previously been slow.

My invention may also be used very successfully in the clarification of water used in the manufacture of artificial ice or water for use in the preparation of food products where exceptionally pure and clear water is desirable. In the case of making artificial ice, the lime-sodium aluminate combination is especially desirable as it clarifies without substantially increasing the soluble salt content of the water.

In instances where it is desired to hasten the settling in water softening plants where lime and soda ash are used, the mere addition of sodium aluminate or its equivalent is sufficient since the lime will be already present and no further addition of this reagent will be necessary.

In all of these cases, the rate of clarification as well as the efficiency of the process is substantially improved, and practically all of the dirt, mud or organic matter present in the water is removed.

While I have described above several specific embodiments of my invention, it will be understood that various changes and substitutions of equivalents may be made without departing from the scope and principles of the invention as set forth in the appended claims.

Having thus described my invention, what I claim as new and desire to secure by Letters Patent of the United States, is:

1. The process of clarifying water which comprises adding to the water a material resulting from the mixing of hydrated lime and a solution of sodium aluminate and caustic soda.

2. The process of rapidly precipitating suspended impurities from water supplies which comprises adding simultaneously thereto quantities of hydrated lime and a solution of sodium aluminate and caustic soda.

3. The process of clarifying water which comprises adding thereto a solution formed from lime, sodium aluminate, and sodium hydroxide.

4. The process of clarifying water which comprises, first, forming a solution containing substantially equal quantities of sodium aluminate and caustic soda, second, adding lime to said solution, third, mixing a small quantity of a solution of such material with the water whereby a flocculent precipitate is obtained, and then allowing the precipitate to settle.

5. A water clarifying material comprising a product obtained by mixing lime with a solution of sodium aluminate and caustic soda.

6. The process of clarifying water which comprises forming a solution containing substantially equal quantities of sodium aluminate and caustic soda, adding hydrated lime to said solution, adding a quantity of a solution of said materials to water whereby a flocculent precipitate is obtained, agitating the water, and then allowing the precipitate to settle.

7. The process of clarifying water which comprises forming a solution containing substantially equal quantities of sodium aluminate and caustic soda, adding hydrated lime to said solution, adding a quantity of a solution of said materials to a supply of water whereby a flocculent precipitate is obtained, agitating said supply of water while it is receiving said solution, and then allowing the precipitate to settle.

8. The process of rapidly precipitating suspended impurities from water supplies which comprises adding simultaneously thereto quantities of lime, sodium aluminate, and sodium hydroxide.

It witness whereof, I have hereunto subscribed my name.

HERBERT A. KERN.